United States Patent
Antrobus et al.

(10) Patent No.: US 9,963,032 B2
(45) Date of Patent: *May 8, 2018

(54) POWER AND DRAG REDUCTION SYSTEM

(71) Applicants: Craig Antrobus, Summerland (CA); Ibrahim Dincer, Oshawa (CA); Calin Zamfirescu, Oshawa (CA); Reza Mohammadali zadeh, Oshawa (CA)

(72) Inventors: Craig Antrobus, Summerland (CA); Ibrahim Dincer, Oshawa (CA); Calin Zamfirescu, Oshawa (CA); Reza Mohammadali zadeh, Oshawa (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/279,125

(22) Filed: Sep. 28, 2016

(65) Prior Publication Data
US 2018/0086201 A1 Mar. 29, 2018

(51) Int. Cl.
| | |
|---|---|
| B60K 6/00 | (2006.01) |
| B60K 17/356 | (2006.01) |
| B60K 7/00 | (2006.01) |
| B60L 7/16 | (2006.01) |
| B62D 35/00 | (2006.01) |
| B60R 1/00 | (2006.01) |
| B60R 1/12 | (2006.01) |
| B60K 3/04 | (2006.01) |
| B60K 1/02 | (2006.01) |
| B60H 1/00 | (2006.01) |
| B60L 11/18 | (2006.01) |
| F01D 15/02 | (2006.01) |
| F01D 15/10 | (2006.01) |
| B60L 11/00 | (2006.01) |
| F01D 25/10 | (2006.01) |

(52) U.S. Cl.
CPC ....... *B60K 17/356* (2013.01); *B60H 1/00007* (2013.01); *B60H 1/00385* (2013.01); *B60K 1/02* (2013.01); *B60K 3/04* (2013.01); *B60K 6/00* (2013.01); *B60K 7/0007* (2013.01); *B60K 7/0023* (2013.01); *B60L 7/16* (2013.01); *B60L 11/002* (2013.01); *B60L 11/185* (2013.01); *B60L 11/1816* (2013.01); *B60R 1/006* (2013.01); *B60R 1/12* (2013.01); *B62D 35/00* (2013.01); *F01D 15/02* (2013.01);
(Continued)

(58) Field of Classification Search
CPC .......... B60K 17/356; B60K 3/04; B60K 6/00; B60K 7/0007; B60K 7/0023; B60K 1/02; B60H 1/00007; B60H 1/00385; B60L 7/16; B60L 11/02; B60L 11/1816; B60L 11/185; B60L 11/002; B60R 1/006; B60R 1/12; B62D 35/00; F01D 15/02; F01D 15/10; F01D 25/10
USPC ................................ 180/165, 2.1, 2.2, 65.21
See application file for complete search history.

(56) References Cited

U.S. PATENT DOCUMENTS

| | | | | |
|---|---|---|---|---|
| 769,565 A | * | 9/1904 | Owen et al. .......... | B60T 8/4081 303/11 |
| 4,413,698 A | * | 11/1983 | Conrad .................... | B60K 1/04 180/305 |

(Continued)

*Primary Examiner* — John D Walters
(74) *Attorney, Agent, or Firm* — Antrobus

(57) ABSTRACT

Power systems, heat exchanger systems, electrical regeneration systems and air drag reduction systems for a wheeled vehicle are provided. The systems comprise a vehicle that includes a compressed air system and electrical system. The power and drag reduction system also comprises a plurality of pneumatic motors, one each connected to each wheel, the pneumatic motors using compressed air to drive each wheel and a plurality of electric motors, two each connected to each wheel, the electric motors using electric power to drive each wheel. Based on operator action, the vehicle is propelled by one of compressed air system operation and electrical system operation. Motors associated with each of the compressed air system and electrical system are attached to and drive each wheel separately. The compressed air system and electrical system operate separately and recharge battery systems.

20 Claims, 9 Drawing Sheets

(52) U.S. Cl.
CPC ............ *F01D 15/10* (2013.01); *F01D 25/10* (2013.01); *B60K 2007/0092* (2013.01); *B60L 2270/46* (2013.01); *B60R 2001/1253* (2013.01); *B60Y 2200/92* (2013.01); *B60Y 2400/15* (2013.01); *B60Y 2400/60* (2013.01); *B60Y 2400/82* (2013.01); *F05D 2220/00* (2013.01); *Y10S 903/906* (2013.01); *Y10S 903/951* (2013.01)

(56) References Cited

U.S. PATENT DOCUMENTS

| | | | | |
|---|---|---|---|---|
| 4,763,751 | A * | 8/1988 | Gardner, Jr. | B60K 6/00 180/305 |
| 7,559,394 | B2 * | 7/2009 | Rask | B60L 11/1887 180/165 |
| 7,828,091 | B2 * | 11/2010 | Wedderburn, Jr. | B60K 6/12 180/2.1 |
| 7,926,610 | B2 * | 4/2011 | Adli | B60K 3/00 180/302 |
| 8,701,804 | B1 | 4/2014 | Antrobus | |
| 8,827,016 | B2 * | 9/2014 | Viengchai | B60K 6/12 180/65.21 |
| 2006/0225941 | A1 * | 10/2006 | Cole | B60K 1/00 180/302 |
| 2007/0258834 | A1 * | 11/2007 | Froloff | B60K 6/12 417/364 |
| 2010/0326749 | A1 * | 12/2010 | Mensah | B60L 11/16 180/65.31 |

* cited by examiner ously indicated illustrations in the figures are
POWER AND DRAG REDUCTION SYSTEM

FEDERALLY SPONSORED RESEARCH OR DEVELOPMENT

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to power and drag reduction systems. More particularly, certain embodiments of the invention relates to a vehicle power system.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, conventional motor vehicles may be powered by combustion. Conventional combustion motors may include a combustible liquid such as petrol, wherein an expansive force from heating the liquid may cause a piston of the engine to move, and thus creating work. This work may prorogate through a multiplicity of shafts and axels, typically known as a drivetrain, to a coupled wheel and may deliver the work to the wheel in a form of torque which may cause the wheel to turn. Some other conventional motor vehicles may be powered by electricity. Conventional electric motors may include current supplied to a stator from a battery, wherein the stator may then become energized to create a rotating magnetic flux. The flux may generate a magnetic field which may result in a current being produce in a rotor position within the stator. The rotating flux and the current may produce a force wherein that force may propagate torque to a coupled wheel. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that with conventional combustion motors, an exhaust, after a combustible liquid has gone through combustion, may need to be expelled. Typically, the exhaust may be expelled into the atmosphere. Furthermore, much of the power created by the combustion may be used to move moving parts of the drivetrain before torque may be delivered to a coupled wheel. With conventional electric motors, a cost to produce such a system may typically be more expensive than the conventional combustion motor. Moreover, the battery which supplies current to the electric motor may only be recharged by plugging the battery into a power supplying station.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A and FIG. 2B illustrate operational component diagrams of an exemplary power system, in accordance with an embodiment of the present invention, wherein FIG. 2A illustrates operational air flow components, in accordance with an embodiment of the present invention, and FIG. 2B illustrates operational electricity flow components thereof;

FIG. 4B illustrates a top view thereof;

Figure 1:
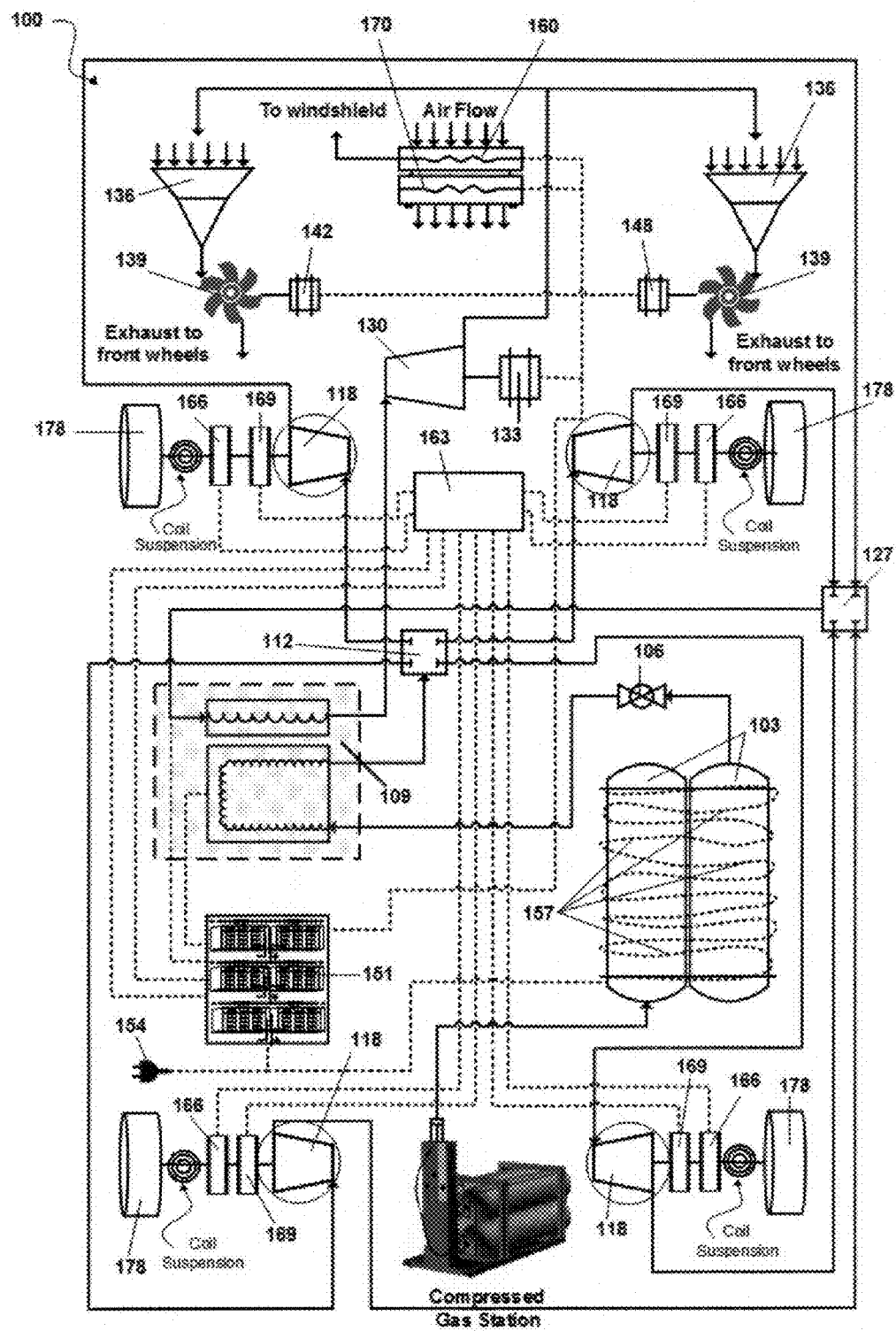
FIG. 1 illustrates an exemplary embodiment of a power and drag reduction systems architecture of a vehicle, in accordance with an embodiment of the present invention

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of the term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Numerous conventional teachings for vehicles and related systems have been generally provided above. They may differ from many embodiments of the present invention in that they may not teach a recharging electric alternating power and air system for a vehicle, in accordance with an embodiment of the present invention of which will be described in some detail below.

In many embodiments of the present invention a compressed gas and electric hybrid system installed in a vehicle may include a combination of at least two efficient and environmentally sensitive power systems. In some embodiments, the at least two power systems may work independent of each other and yet may also work in conjunction with each other as well. Thus, in a case that one of the systems may fail, the other system may still work and potentially be operable to get occupants to safety. The at least two systems working in conjunction may also provide multiple layers of redundancy for safety and ease of operation. In many embodiments, an operator may choose which power system to power the vehicle and switch back and forth as desired. Furthermore, in many embodiments, both systems may be recharged at any time.

In many embodiments an electric power system may achieve an individual vehicle travel distance of approximately 345 km before needing to be refueled and an individual compressed air power system may achieve an individual vehicle travel distance of 272 km before needing to be refueled In some embodiments, the compressed air and electric hybrid system may achieve a combined vehicle travel distance between 600 km to 800 km depending on factors such as, and without limitation, which system may be used first and outside ambient temperatures.

In many embodiments, refueling may be required with refueling times possibly being very quick. In some embodiments, a cost to manufacture, use, and maintain a vehicle in accordance with an embodiment of the present invention, may be far less than conventional combustion vehicles or conventional all electric vehicles. In some embodiments, greenhouse gas emissions (exhaust) may be far less than with combustion vehicles or conventional all electric vehicles. In many embodiments, the power systems may be much safer than conventional all electric vehicles or conventional combustion vehicles. In many embodiments, it may be contemplated that a compressed air and electric hybrid system installed in a vehicle, in accordance with an embodiment of the present invention, may be better for the environment than conventionally powered vehicles. Furthermore, benefits of some embodiments of the present invention may be easily recognized by the general public.

FIG. 1 illustrates an exemplary embodiment of a power system architecture of a vehicle 100, in accordance with an embodiment of the present invention. In many embodiments, the exemplary power system of the vehicle may include both an electric power system and a compressed air power system, wherein the electric power system and the compressed air power system may be interconnected. In the present embodiment, the power system architecture may include a gas storage device 103, a regulator device 106, a first heating unit 109, an input multidirectional valve 112, four pneumatic motors 118, an exhaust multidirectional valve 127, an air turbine motor 130, a first generator 133, an intake grill system 136, two impellers 139, two generators 148, a multiple battery systems 151, a plug-in charging system 154, a second heating system 157, a heat pump device 160, an auxiliary heating element 170, a switching device 163, four forward electric motors 166, and a multiplicity of wheels 178.

In many embodiments the compressed air power system may be, for example, and without limitation, a compressed air power system, wherein the air storage device may be configured to store compressed air. Furthermore, in the present embodiment, gas storage device 103 may be operably coupled to a compressed air station, such that, gas storage device may be connected to a compressed air pump and filled with compressed air. In some exemplary alternative embodiments, the air storage device may include a multiplicity of operably coupled tanks, wherein each tank may be in a range of particular sizes, volumes, shapes, and structures. Tanks may be composite fiber with a minimum rating of 13,000 PSI and the size is approximately 22 inches in diameter×4 feet long located under the front and rear seating of the vehicle.

In the present embodiment the air storage device may also be operably coupled to regulator device 106. In some exemplary alternative embodiments, the regulator device may include a pressure regulator such as, without limitation, a single stage pressure regulator or a double stage pressure regulator. In the present embodiment, the regulator device may reduce an air flow pressure output pressure of 13,000 PSI from the gas storage device to an optimal operating pressure of approximately 300 PSI.

In the present embodiment, the regulator device may further be operably coupled to first heating unit 109, wherein the first heating unit may include a heat exchanger comprising Phase Change Materials (PCM)s, such as, and without limitation paraffin, fatty acids, salt hydrates, eutectics, and hygroscopic materials, or any combination thereof. The first heating unit may store low temperature heat (thermal energy) captured, in phase change materials, from air expansion. A heat transfer may occur when a material changes from solid to liquid, or liquid to solid. Thus when ambient temperature is low, these solid-liquid PCMs may perform like self-regulating thermal storages, wherein their temperature may rise as they absorb heat. When a PCM temperature reaches a melting point, a PCM may absorb and release heat at a nearly constant temperature. Furthermore, in some exemplary alternative embodiments, the heat exchanger may be configured to be, for example, and without limitation, a shell and tube heat exchanger, a plate fin heat exchanger, a fluid heat exchanger, a phase-change heat exchanger, or a direct contact heat exchanger, wherein the heat exchanger may also be configured to have a multiplicity of gas input ports and heated gas output ports. In the present embodiment, the first heating unit may utilize an electric charge from multiple battery system 151 to heat the air to an optimum operation temperature.

Furthermore, in the present embodiment, air may be directed into, operably coupled, input multidirectional valve 112, wherein the input multidirectional valve may include at least one input port for receiving air from the first heating unit, and may further include at least four output ports for directing the gas to four pneumatic motors 118.

In some exemplary alternative embodiments, the four pneumatic motors 118 may include, for example, and without limitation, compound engine motors, multi-stage expansion motors, a four-stage expansion motor, rotary vane motors, a turbine or any combination thereof, wherein compressed air may travel through stages of the motors and impart energy to move a multiplicity of pistons and a central shaft throughout the stages. Furthermore, downstream stages may use exhaust from upstream stages, such that a final exhaust may be of a lower energy state than an initial energy state. In the present embodiment, respective central shafts of the four pneumatic motors, may be directly connected to respective wheels 178 of the vehicle, and thus power may be transmitted directly to the wheels as opposed to possibly having to propagate through a multiplicity of powertrain elements as with conventional vehicles. It may be contemplated that the direct connection may greatly improve efficiency as it may eliminate a substantial amount of mechanical friction losses associated with moving the multiplicity of powertrain elements.

When air may be expanded with a large expansion ratio, temperature of the air may reduce dramatically, furthermore, if there may be any moisture in the air, it may cause freezing which affects the above described pneumatic motor operation. In order to possibly avoid this problem, this system requires heat addition before expansion. Increasing air temperature before entering the pneumatic motors may increase system work potential and may directly improve system efficiency. Furthermore, in the present embodiment, the pneumatic motors each may be operably coupled to exhaust multidirectional valve 127, wherein used air from the four pneumatic motors 118 may be directed to the exhaust multidirectional valve. The exhaust multidirectional valve may include at least four input ports for receiving air from each of the pneumatic motors, and may further include at least one output port for directing the gas back to heating unit 109.

First heating unit 109 may also be operably coupled to exhaust motor 130, wherein the exhaust motor 130 may be for example, and without limitation, a turbine. In the present embodiment, the exhaust motor may be operably connected to first generator 133, wherein the first generator may be an electric generator and exhaust motor 130 may drive the first generator to produce an electric charge. The first generator powering motor may also be operably coupled to intake grill system 136

In some embodiments, intake grill system 136 may include a single unit comprising a multiplicity of portions spread across the entire front of the vehicle, wherein an outer portion may further include diverters for diverting intake air to impellers 139 to power generators 148. The outer portion may include a multiplicity of edge portions. In the present embodiment the intake air that may be diverted may be air from the exhaust motor mixed with air from an external atmosphere of the vehicle. In some alternative embodiments, portions of the intake grill system may include for example, and without limitation, a mesh structure, vertical or horizontal bars, open scoops, hood scoops and side scoops, or any combination thereof that may provide air to be taken into the portions of the intake grill system.

In the present embodiment, portions of the grill intake system may be operably coupled to impellers 139 to power generators 148. In some alternative embodiments the impellers may be configured to be, for example, and without limitation, open, semi-open, closed or shrouded. Furthermore, in the present embodiment the impellers 139 may be operably connected to generators 148. Air directed to the impellers 139 may act on the impellers 139 which may drive the generators 148 respectively to produce an electric charge.

In the present embodiment, generators 148, may be operably coupled to multiple battery systems 151, wherein the battery may receive the charge produced by each generator. Furthermore, in the present invention, multiple battery system 151 may be an advanced Li-Ion battery with 0.875 MJ/kg total charge, 2 MJ/l energy density, and 90% charge discharge efficiency. In some embodiments, the battery may be used until the charge depletes to 20% of the total charge. Available battery storage may be of 0.7 MJ for 1 kg of battery and the assumed electric powertrain efficiency may be 85%. In some embodiments, an optimum battery may have 125 kg with a capacity of 24 kWh and a battery volume of 75 l. In the present embodiment, multiple battery system 151 may include plug-in charging system 154, wherein the plug-in charging system may be configured to include two different sub-systems. In some embodiments, one sub-system of the plug-in charging system may be a 120-volt trickle charge system for long session charging periods, for example, and without limitation, when an operator may wish to charge the battery overnight, and/or when an operator may be at work or other function, and/or substantially any time in which an operator may desire to spend a relatively long period of time charging battery 151. With this sub-system, charge may also be sent to second heating unit 157 for powering of the second heating unit, wherein the second heating unit may include heat trace lines. In many embodiments, heat trace lines may include cables comprising high resistance wire in physical contact with air storage device 103, wherein current applied to the heat trace lines may increase the temperature of the heat trace lines and thus increase the surface temperature of the gas storage device. In some alternative embodiments, the second heating unit may be configured to be heat trace lines configure as, for example, and without limitation, a constant electric power series, a constant electric power zone, self-regulating, high output 12-volt heat trace lines positioned circular around the storage device 103 with no overlaps. The tanks and heat trace lines are then to be covered with closed cell foam insulation, or any combination thereof. In some embodiments another sub-system of the plug-in charging system may be a quick charge (DC) system that may quickly charge the battery during relatively short momentary time periods such as, and without limitation, an operator briefly stopping to refuel the air storage devices, and/or an operator briefly stopping at a charging station while en route to a particular destination, and/or substantially any time in which an operator may desire to spend a relatively short period of time charging battery 151. With this sub-system, charge may also be sent to the first heating unit 109 for powering of the heating unit. In the present embodiment heat pump 160 may be configured as a reversible heat pump and thus may include a heating mode and a cooling mode. Heat pump device may further be operably coupled to a portion of the intake grill, wherein environmental air passing through the in-take grill may be directed into and through the heat pump.

In the present embodiment, battery 151 may be operably coupled to the power generators 148, the first heating unit 109, the second heating unit 157, the heat pump 160, auxiliary heating element 170 and a charging station via the plug-in charging system 154, as described above. Also, in the present embodiment, battery 151, may further be operably coupled to the switching device 163, wherein the switching device may be configured to include a multiplicity of poles and throws. In some alternative embodiments, the switching device may be configured to optimally switch between terminals of relative high power switching conditions and also optimally switch between terminals of relatively large inductive loads, wherein actuation of the switching device may originate from a mechanical input of an operator. The switch receives its signals from the accelerator and brake pedals in association with the direction of travel of the vehicle. The switching device may be operably coupled to the mechanical input of an operator by being able to receive signals when an operator may actuate, at least one of, a forward button, a reverse button, an acceleration pedal, and a brake pedal. The switching device may further be operably coupled to four forward electric motors 166, four reverse electric motors 169. In some embodiments, the received signals may cause the switching device to direct electricity out of the battery and towards the electric motors. When the vehicle is in the forward direction and the accelerator pedal is depressed the switch connects the electricity from the batteries 151 to the forward motors 166. When pressure is removed from the accelerator pedal the electric flow stops and the vehicle is in a coasting motion when the brake pedal is depressed the switch connects the electricity to the reverse electric motors 169 which are now turning in the direction opposite to their power and thereby turning them into generators which send electricity back to the batteries 151 (regenerative braking).

In the present embodiment four forward electric motors 166, four reverse electric motors 169, may include central shafts that may rotate when electricity may be sent to each of the electric motors respectively. The central shafts may be directly connected to respective wheels 178 of the vehicle, and thus power may be transmitted directly to the wheels as opposed to possibly having to propagate through a multiplicity of powertrain elements as with conventional vehicles. It may be contemplated that the direct connection may greatly improve efficiency as it may eliminate a substantial amount of mechanical friction losses associated with moving the multiplicity of powertrain elements.

In some alternative embodiments, a front of an intake grill system may include a relatively small diameter mesh, lining the front of the intake grill to prevent debris from entering the air flow system. In another alternative embodiment, the intake grill system may include a switch actuated wiper to remove debris that may be blocking an intake grill system.

In many alternative embodiments, a switching device may further be operably coupled to a first heating unit 109, a second heating unit 157, a heat pump 160, auxiliary heating element 170, two generators 148 and generator 133. Furthermore, in some alternative embodiments, a switching device may be configured to be a processor such as, without limitation, a microprocessor, programmable intelligent computer (PIC™) chip, a PICmicro™ chip, a programmable logic controller (PLC), a programmable logic relay (PLR), a PLC on a Chip™, a field programmable gate array (FPGA) or any combination thereof. In some alternative embodiments, at least one of the three generators 133 and 148, and any combination thereof may be operably coupled to at least one a first heating unit 109, a second heating unit 157, a heat pump 160, auxiliary heating element 170 and any combination thereof, wherein electricity may be directly provided to the at least one first heating unit, second heating unit, heat pump, auxiliary heating element 170 and any combination thereof, by any of the three generators 133 and 148, and any combination thereof. Furthermore, the electricity may be directly provided when a power saving mode may be switched on. In some alternative embodiments an operator may trigger buttons to drive electricity to or away from particular components. In some other alternative embodiments driving electricity to or away from particular components may be automatically triggered by an on-board processor receiving data form from temperature and pressure sensors installed throughout a vehicle. In yet another alternative embodiment, driving electricity to or away from particular components may be automatically triggered by a remote processor in wireless communication with an on-board processor, wherein temperature and pressure sensors installed throughout the vehicle may communicate data to the on-board computer. In some other alternative embodiments, a switching device may be configured to process sensed feedback from a device operably coupled to the switching device.

Figure 2A:
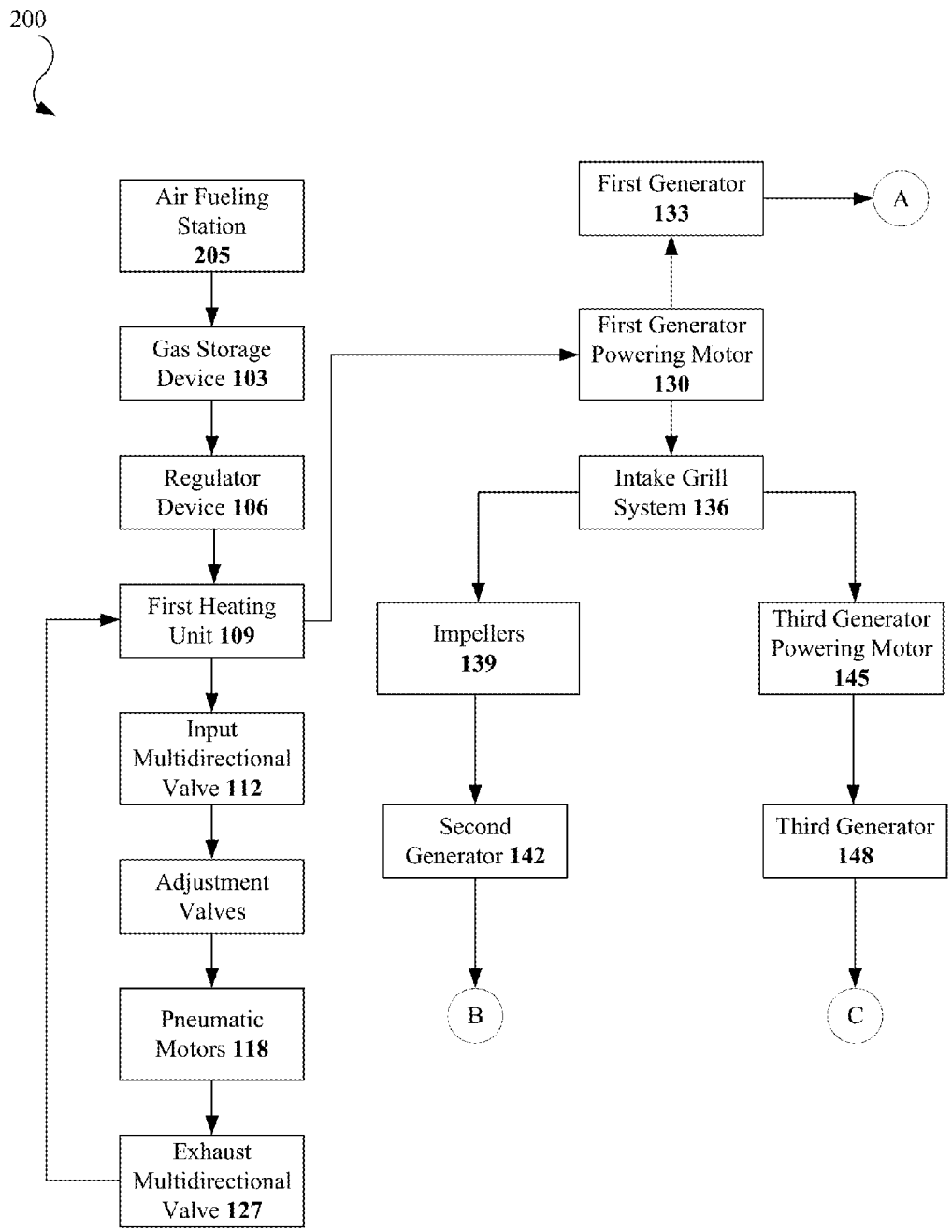
Figure 2B:
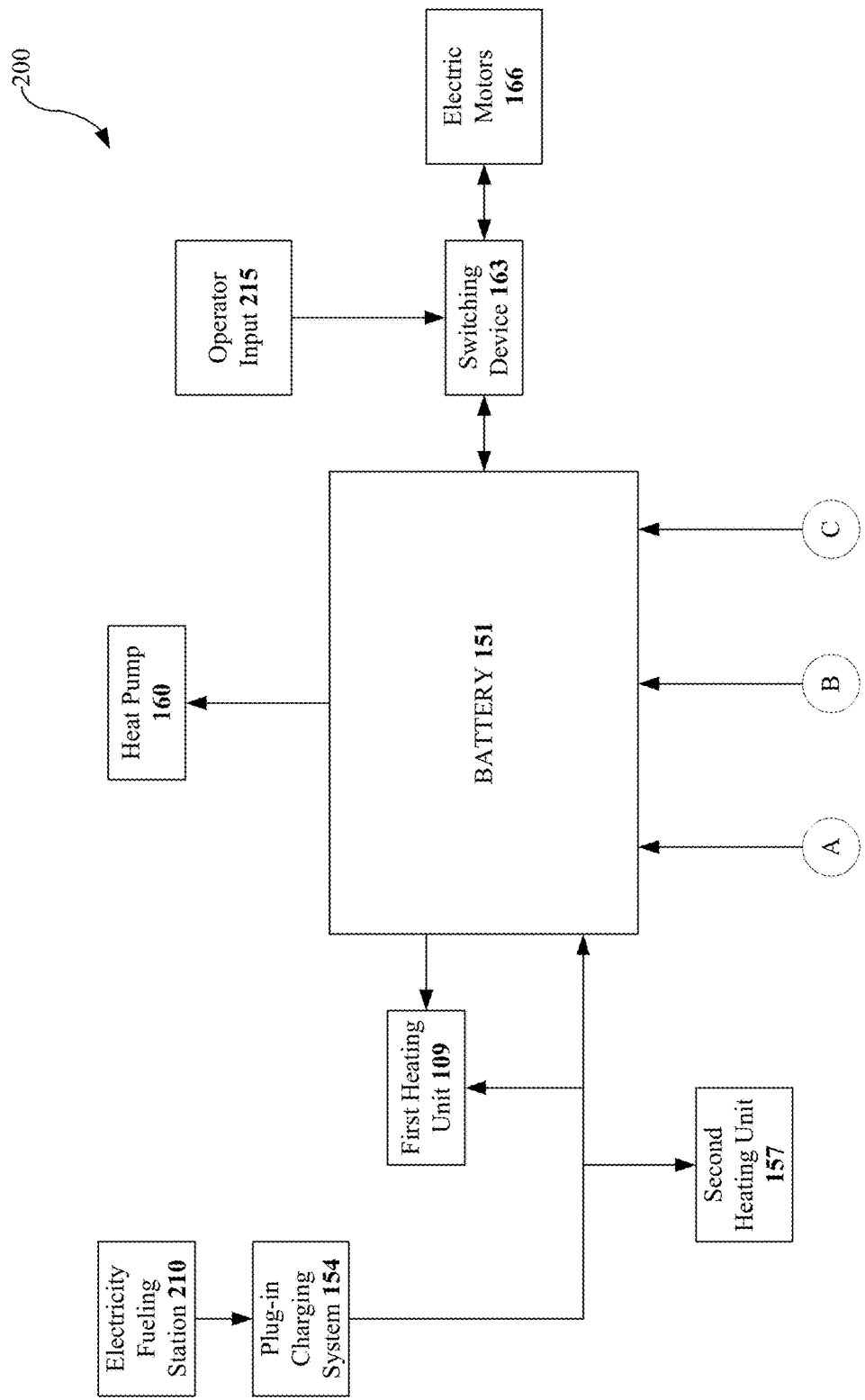

FIG. 2A and FIG. 2B illustrate operation component diagrams of an exemplary power system 200, in accordance with an embodiment of the present invention. It should be noted that FIGS. 2A and 2B reflect the system components layout and locations. FIG. 2A illustrates operational air flow components, in accordance with an embodiment of the present invention. In the present embodiment, and with reference to FIG. 1, a gas refueling station 205 may be configured to inject and fill air storage device 103 with cool, dry clean air, wherein air refueling station may be a large size specialized station used for fast filling of the air storage device with dry air. In some other alternative embodiments, the air storage device may be filled with substantially any non-flammable air. In the present embodiment the air filled air storage device 103 may be configured to be filled to a pressure of, for example, and without limitation, 13,000 PSI. During acceleration, the air in the gas storage device 103 may travel to the regulator device 106, wherein the regulator device may be configured to reduce the pressure from the exemplary 13,000 PSI to an exemplary, without limitation, 300 PSI. In some embodiments, 300 PSI may be an optimal operating pressure for the pneumatic motors. The reduced pressure air may then pass through the first heating unit 109, wherein the first heating unit may be configured to heat the air to an optimum operating temperature for the pneumatic motors. The heated air may then travel to the input multi-directional valve 112 wherein, the input multidirectional valve may be configured to evenly distribute the heated air and further may direct the distributed air toward four pneumatic motors 118. Each pneumatic motor may be configured to include an adjustment valve located upstream from the motor such that air may pass through the adjustment valve before reaching a particular pneumatic motor. The adjustment valve may be configured to provide air adjustments to the pneumatic motors when the vehicle may be turning. Exhaust (air sent through the motors) from the pneumatic motors may be combined together in the exhaust multidirectional valve 127, wherein the exhaust multidirectional valve may be further configured to pass the combined air back to the first heating unit 109. The first heating unit may be configured to again heat the air to an optimum operating temperature and then may pass the reheated air to the exhaust motor 130. The exhaust motor 130 may be configured to have the reheated air pass through the exhaust motor 130 and further be configured to power the first generator 133 to possibly produce electrical output. The exhaust motor 130 may also be configured to provide exhaust air to a portion of the intake grill system 136. The portion of the intake grill system may be configured to collect the exhaust air and may collect external environment air which may have come through the intake grill system from outside the vehicle. The portion of the intake grill system may further be configured to pass the collected air through the impellers 139 simultaneously. Each of the impellers 139 may be configured respectively to have the collected air pass through each of the impellers. The impellers may be further configured to power the generators 148 to possibly produce electrical output. Furthermore, each of the impellers may further be configured to provide exhaust that travels to front tires, wherein the airspeed of the exhaust may be a reduced speed with respect to an airspeed before passing through each of the impellers respectively. Moreover, the reduced airspeed air may provide an air screen as an active aerodynamic, which may divert oncoming air around a front tire which may reduce the drag of the vehicle by approximately 10% and may subsequently increases a cruise driving range.

Furthermore, FIG. 2B, illustrates operational electricity flow components, in accordance with an embodiment of the present invention, and with further reference to FIG. 1, plug-in charging system 154 may be configured to be plug into an outlet at an electricity fueling station 210. In return, the electricity fueling station may be configured to provide electrical charge to the plug-in charging system. The plug-in charging system may be configured to provide electric charge to battery 151, first heating unit 109 and second heating unit 157. When the second heating unit 157 may be receiving electrical charge, it may keep the air storage tanks warm during cold weather so the vehicle may be started easily. Furthermore, the battery may be configured to receive additional electric charge from first generator 133, second generator 142, and third generator 148. Battery 151 may be configured to send electrical charge to the first heating unit 109, heat pump 160, auxiliary heating element 170, four forward electric motors 166, wherein electricity sent to the electric motors may be gated by switching device 163. The switching device may be configured to receive signal input 215 from an operator pressing and releasing a brake pedal, pressing and releasing an acceleration pedal, and pressing buttons indicating a forward or reverse direction. Furthermore, in response to an operator pressing buttons to indicate a forward or reverse direction, electricity, from battery 151, may be sent to the electric motors as chosen by the forward and reverse buttons in the vehicle. These buttons may operate the switching device to direct the electricity to required motors. In response to an operator applying pressure to an acceleration pedal, the switching device may send electricity to four of the electric motors to drive the vehicle. In response to an operator releasing the acceleration pedal and/or the brake pedal, the vehicle may enter into a full coast with no power being applied to the wheels. In response to an operator applying pressure to a brake pedal, the switching device may reverse electricity flow such that, electricity, from the four electric motors opposite to the direction of travel, may flow back to the battery during braking and thus executing a regenerative braking system. As more pressure may be applied to the brake pedal, the electrical motors may become more engaged and thus may slow the vehicle more quickly. In a case that a braking speed may not be sufficient, when full force may be applied to the braking pedal, standard disc brakes may be applied to stop the vehicle completely. In the present embodiment, electricity may be generated at least by the regenerative braking system, the exhaust air from the compressed air system passing through the exhaust motor and air passing through impellers 139.

Figure 3:
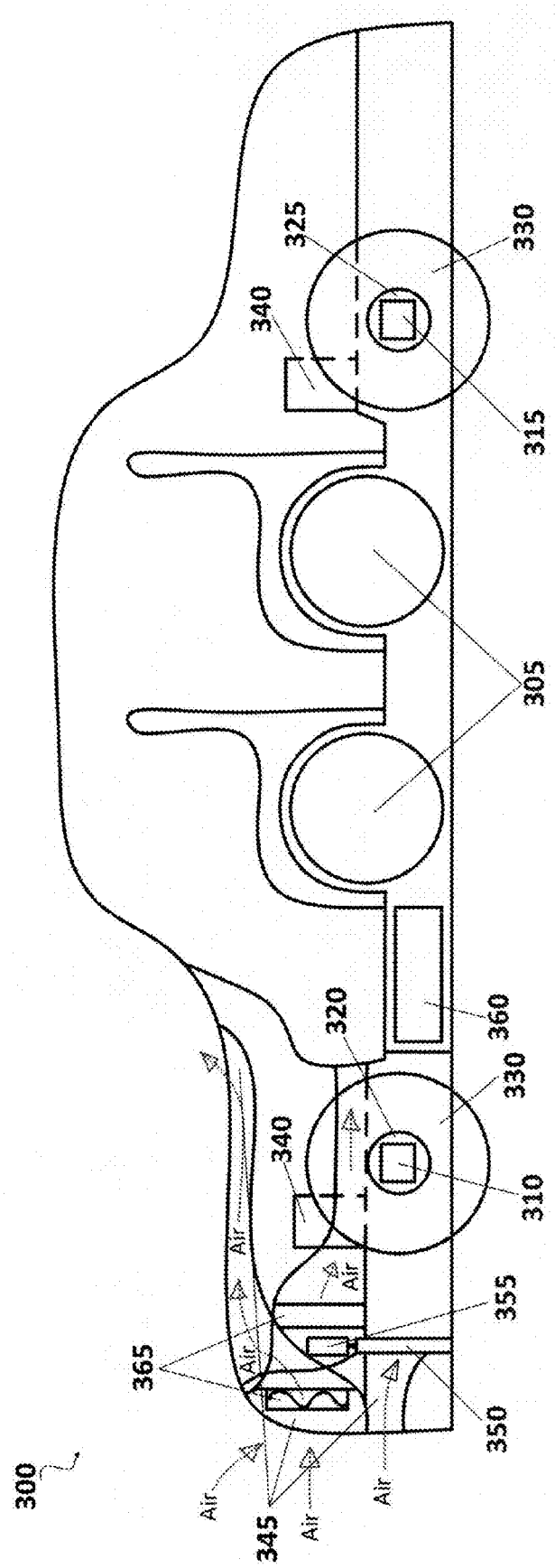
FIG. 3 illustrates a side view of another exemplary embodiment of a power and drag reduction systems architecture of a vehicle, in accordance with an embodiment of the present invention.

FIG. 3 illustrates a side view of another exemplary embodiment of a power system architecture of a vehicle 300, in accordance with an embodiment of the present invention. Moreover, it should be noted that FIG. 3 illustrates a cross-section through FIG. 2, where trace lines to the tanks are omitted for the sake of clarity. In the present embodiment, the power system architecture may include air storage device 305, wherein the air storage device may include a multiplicity of storage devices. In the present embodiment the storage devices may be configured to be cylindrical or circular shaped tanks. Furthermore, the multiplicity of storage devices may be fixed to the vehicle at a different position with respect to each other, wherein the different positions may include a distance large enough for a person to fit between. The different positions may also include under a front and back seat.

In the present embodiment, the power system architecture may further include pneumatic motors 310 and 315, four forward electric motors 320, four reverse electric motors 325, wheels 330, wherein the pneumatic motors and the electric motors may be positioned adjacent to each other directly on an axel of the wheels 330.

In the present embodiment, the power system architecture may also include a battery system 340, wherein the battery system may include a multiplicity of separated battery portions. The separated battery portions may include a front portion and a rear portion, wherein the front portion may be positioned within a front portion of the vehicle and a rear portion may be positioned in a rear portion of the vehicle. In some embodiment one of the multiplicity of separated battery portions may send electricity to electrical components located in a first area of a vehicle while another one of the multiplicity of separated battery portions may send electricity to different electrical components located in a second area of the vehicle.

In the present embodiment, the power system architecture may also include an intake grill system 345, impellers 350, generators 355, a heating unit 360, and a heat pump device 365. The intake grill system may include a multiplicity of air intake portions, wherein the air intake portion may direct external environmental air to flow to a multiplicity of portions of the vehicle. The multiplicity of air intake portions may direct external environmental air toward at least a windshield portion, under car portion, and front tire portions of the vehicle. The directed external environmental air may act as an air blanket to reduce a drag coefficient. One of the multiplicity of air intake portions may direct environmental air to flow through the impellers and further to front wheels 330 and/or to an under car portion. This may cause the impellers to power the generator 355 which in turn may provide electricity to the battery system and may provide electricity directly to the heating unit while also reducing drag by the flow of air acting as a wind screen for the wheel. Furthermore, another one of the multiplicity of air intake portions may direct environmental air to flow through a portion of the heat pump device to provide heated or cooled air to a windshield portion of the vehicle, wherein the heat pump may include a coiled portion. This may further reduce a drag coefficient. Moreover, another one of the multiplicity of air intake portions may direct air to flow through a portion of the heat pump and toward the front wheels to provide heated or cooled air to the wheel and motors. The air entering the intake grill system may also reduce the air travelling under the vehicle and thus reduce drag, and create a smooth surface under the car, which may further reduce drag. Exhaust in front of the front tires may act as a wind curtain that may direct the air around the front tires thereby also reducing drag. The wind curtain and the air entering the intake grill system may also reduce the air travelling under the car and thus also reducing lift which again reduces a drag coefficient.

Figure 4A:
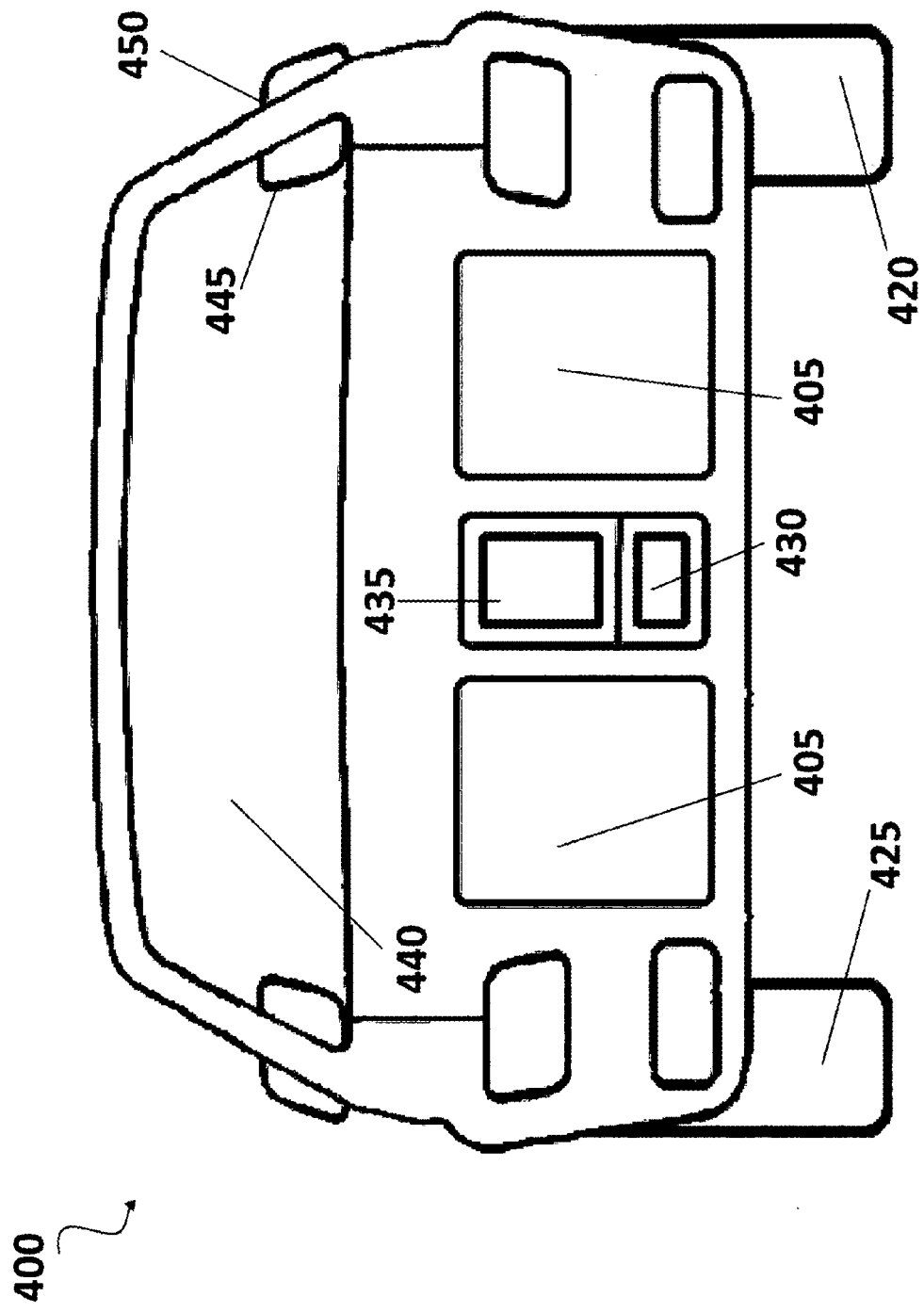
FIGS. 4A and 4B illustrate a multiplicity of views of an exemplary embodiment of some power and drag reduction systems components of a vehicle, in accordance with an embodiment of the present invention, where FIG. 4A illustrate a front view, in accordance with an embodiment of the present invention
Figure 4B:
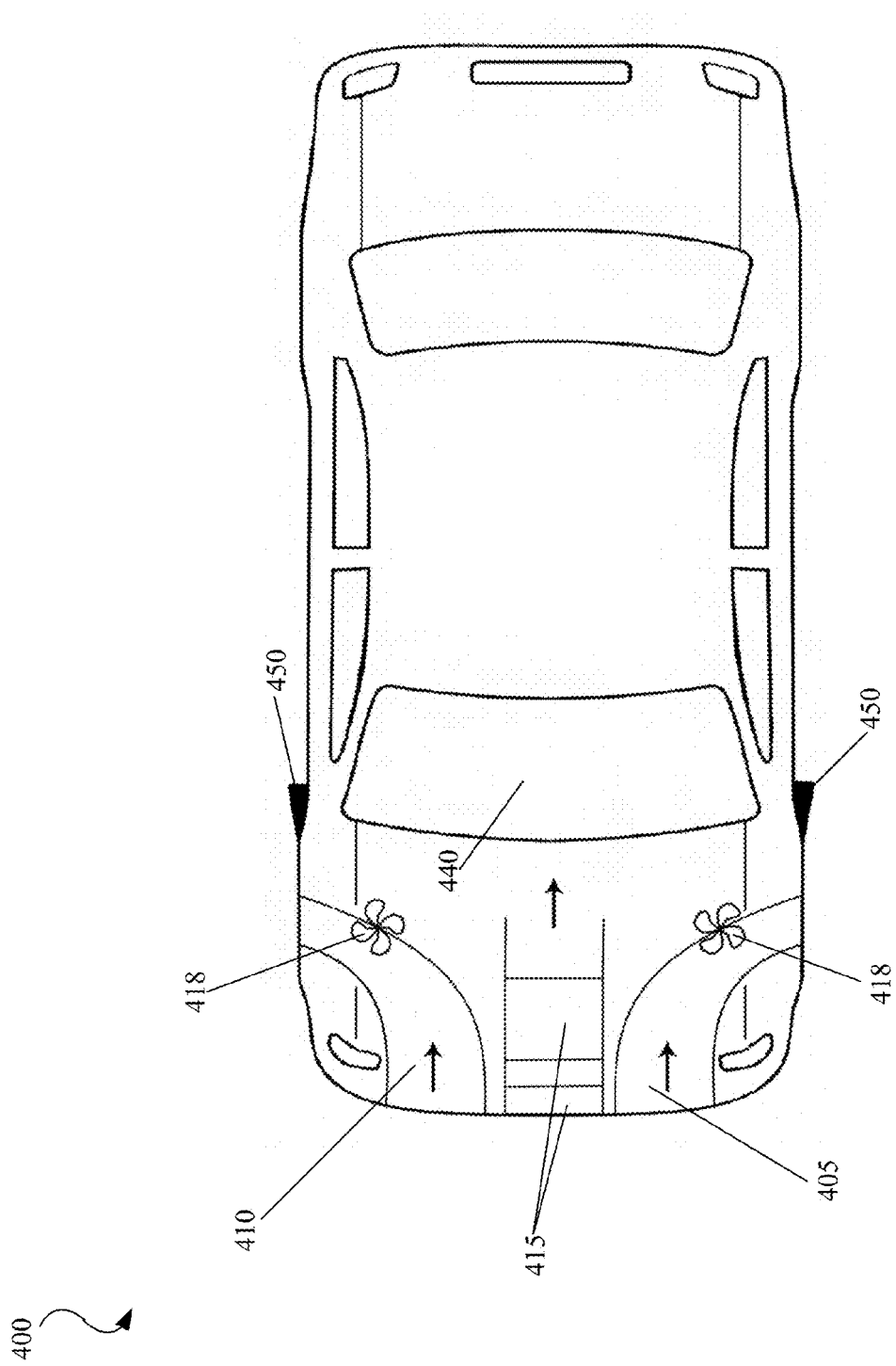

FIGS. 4A and 4B, illustrate a multiplicity of views of an exemplary embodiment of some power system components of a vehicle 400, in accordance with an embodiment of the present invention, where FIG. 4A illustrate a front view, in accordance with the embodiment, and FIG. 4B illustrates a top view thereof. In the present embodiment the power system may include a multiplicity of portions of an intake grill system, wherein the intake grill system may further include two side portions 405, and two central portions 430 and 435. The side portions may allow external environmental air to enter the intake grill system and be directed passed two impellers 418 towards the front tires. Also, external environmental air travelling through the intake grill system may combine with exhaust air from the exhaust motor (not illustrated in FIG. 4A or FIG. 4B but is illustrated in FIG. 1), and would generate electricity by turning the impellers 418 which may drive two generators to charge batteries or use directly in a first heating unit. In the present embodiment, the power system may also include an electrically powered auxiliary heating element 430 and a heat pump 435, wherein during extreme cold temperatures, the electrically powered auxiliary heating element may provide heat for the vehicle. Furthermore, the central portion of the intake grill system may allow external environmental air to enter the intake grill system and be directed toward both the electrically powered auxiliary heating element and the heat pump, wherein the heat pump may cool or heat the air as it may be further directed toward windshield 440.

Also, in the present embodiment, the vehicle may further include a multiplicity of side mirrors, wherein the side mirrors may include at least two portions. A first portion 445 may be position inside a cabin of the vehicle and a second portion 450 may be positioned outside the cabin of the vehicle. The second portion may include a mirror and a high frame rate video camera, both pointing in a rearward and side direction with respect to the vehicle to possibly allow an operator to visualize rearward and side surroundings. The high frame rate video camera may continuously capture images while the vehicle is running. Furthermore, the first portion may include a display device to continuously display image information captured by the high frame rate video camera of the second portion 450 so as to possibly provide a real-time wide angle view which may eliminate potential blind spots. In some alternative embodiments, the vehicle may further include a set of side mirror control switches, wherein the control switches may allow an operator to rotationally adjust the mirror of the second portion and further independently adjust the camera of the second portion. The control switches may allow for camera zooming, panning, translation, and a transition into a night vision mode or thermal imaging mode to possibly allow for better operator visualization at night and/or in inclement weather. The control switches may also further provide an operator the ability to adjust display setting such as brightness, contrast, and sharpness etc., to better visualize the displayed image information. In some alternative embodiments a video camera may include image object detection functionalities to visually mark particular image objects that may move into a field of view of the video camera.

Figure 5:
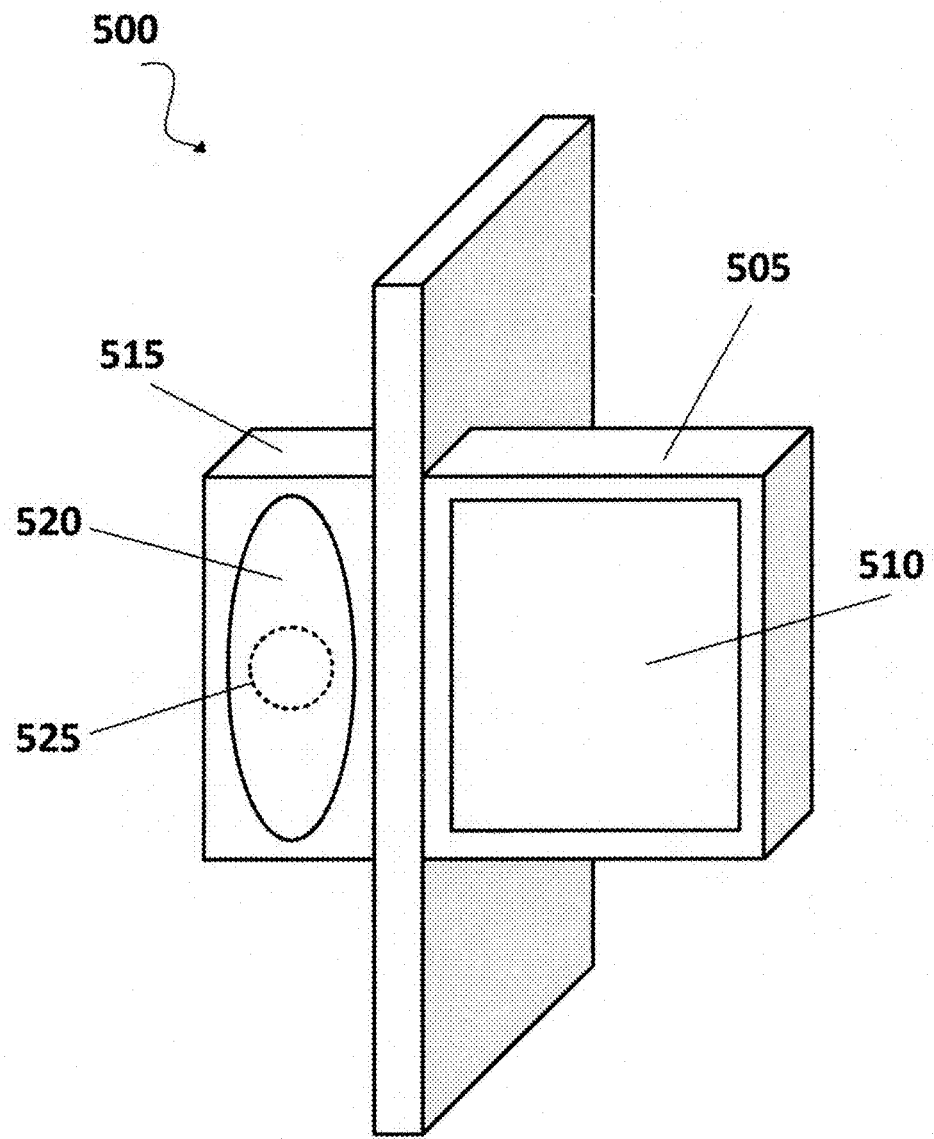
FIG. 5 illustrates an exemplary drag reduction system component, in accordance with an embodiment of the present invention.

FIG. 5 illustrates an exemplary power system component 500 in accordance with an embodiment of the present invention. In the present embodiment, the power system component may include a blended mirror camera display system, wherein the blended mirror camera display system may further include at least two portions. A first portion 505 may be position inside a cabin of a vehicle, wherein the first portion may be configured to include a housing that contains a display device 510. A second portion 515 may be position outside the cabin of the vehicle, wherein the second portion may be configured to include a housing that contains a mirror 520 and a camera 525. In the present embodiment, mirror 520 may be configured to be a one-way mirror, wherein a reflective side may be directed toward the rear and side of the vehicle which may allow an operator to see rear and side surroundings of the vehicle. Furthermore, camera 525, may be configured to be a video camera to continuously capture image data in a field of view of the camera. The camera may be positioned inside of the second portion housing and may further be configured to point towards the rear and side of the vehicle, and thus may be able to capture image data of rear and side vehicle surroundings through the mirror 520. The captured image data may then be displayed to an operator by display device 510. Blending mirrors and cameras into a side body of a vehicle may increase safety by potentially providing a wider field of view for the operator. Furthermore, placing the first portion of the blended mirror camera display system inside the cabin of the vehicle may also improve fuel efficiency by potentially reducing a substantial amount of drag from the mirrors and thus possibly making the vehicle more aerodynamic. It may be contemplated that a 2% improvement on fuel efficiency may be achieved.

Figure 6:
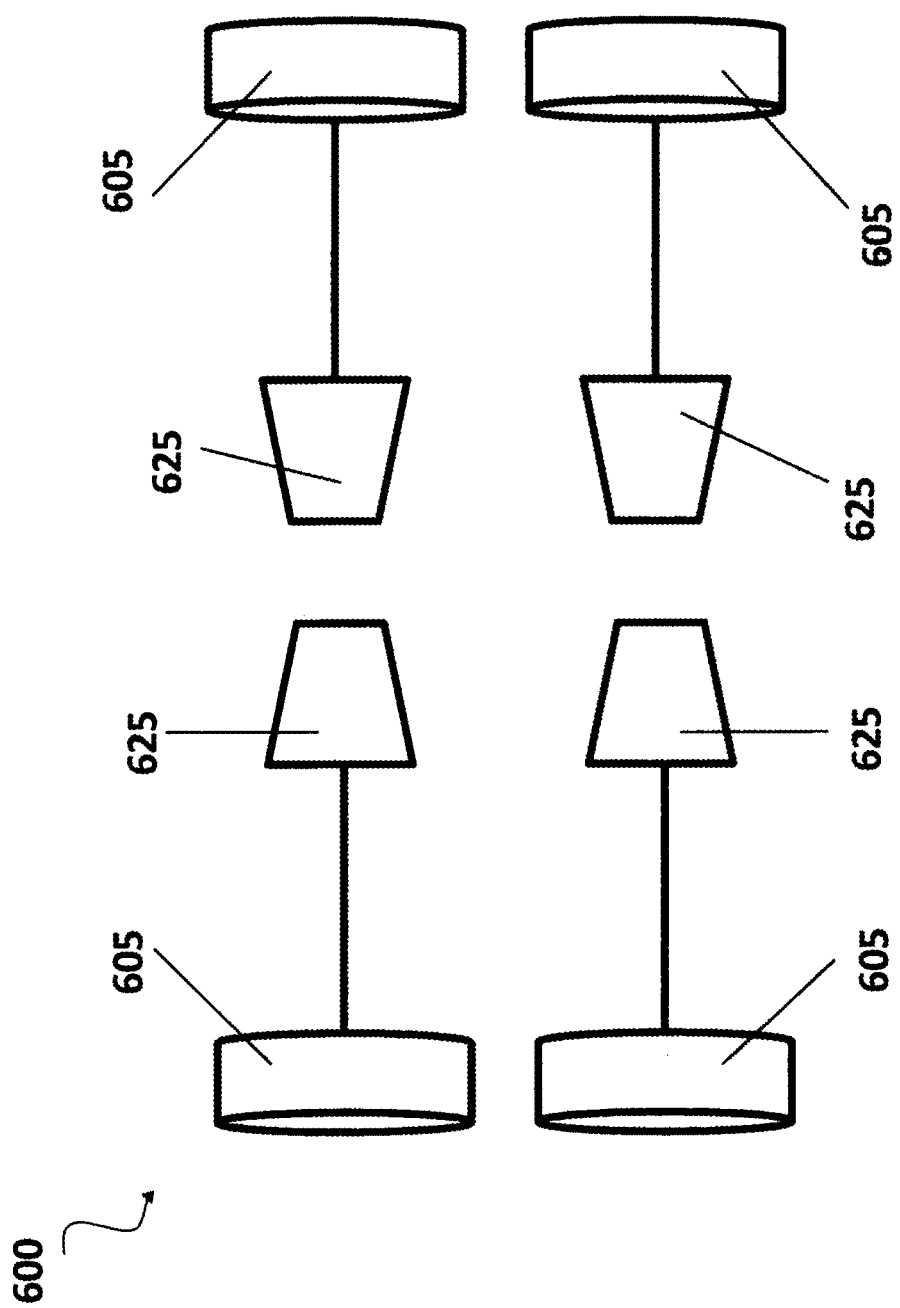
FIG. 6 illustrates some exemplary power systems components in accordance with an embodiment of the present invention.

FIG. 6 illustrates some exemplary power system components 600 in accordance with an embodiment of the present invention. In the present illustrative embodiment, the power system components may include wheels 605, wherein each wheel may be moveably connected to its own individual axel thus forming a wheel axel pair. Furthermore, the power system components may further include four pneumatic motors 625, wherein each wheel axel pair may be operably connected to one of the motors without an intervening transmission or multiple drive train shafts. By eliminating a transmission, it may be contemplated that time may be saved on manufacturing costs and also gain efficiency. A powertrain as illustrated by the teachings of the present invention may have more efficiency due to much less friction from mechanical systems.

Figure 7:
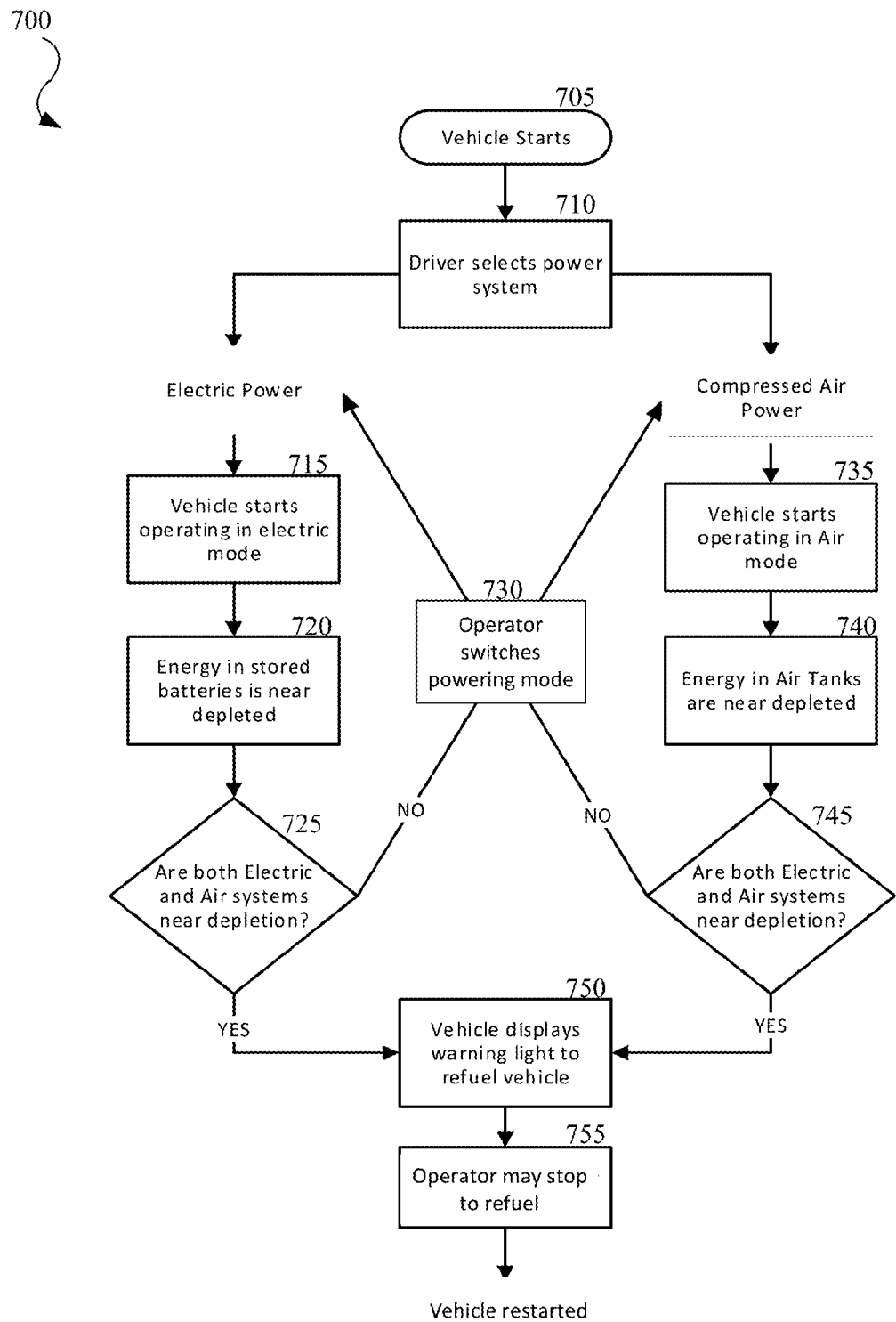
FIG. 7, illustrates an exemplary method embodiment of using an exemplary vehicle power system, in accordance with an embodiment of the present invention.

In some embodiments of the present invention multistage expansion cascaded systems may be integrated with an inter-stage reheater. This describes the air from the four pneumatic motors 118 being reheated 104 and then sent to the exhaust motor 130. At a highest pressure, air may be expanded in pneumatic motors which may be the most compact. At a lowest pressure, air collected from a multiplicity of vehicle components may be expanded in a single larger-size air turbine. It may be contemplated that reheating two cascaded expansion stages may be optimal because more work may be retrieved and icing of an exhaust pipe while air cools down during expansion may be avoided. The inter-stage reheater may require a special design because the inter-stage reheater may operate at temperatures close to an ambient temperature in order to reheat large volumes of air FIG. 7, illustrates an exemplary method embodiment 700 of using an exemplary vehicle power system, in accordance with an embodiment of the present invention. In the present embodiment, an operator may start a vehicle, in a step 705, wherein the vehicle may be configured with the exemplary power system as illustrated in FIG. 1. Next, the operator may select which power mode to operate the vehicle under in a step 710. For exemplary illustrative purposes, and without limitation, the operator may select to operate the vehicle under electric power. Those skilled in the relevant, in light of the teaching of the present invention would readily recognize that an operator may initially select to operate the vehicle under electric power or air power. In a step 715, the operator may begin operating the vehicle under electric power. After driving the vehicle under electric power, for some distance, energy stored in a battery of the vehicle may near depletion in a step 720. Next a determination may be made in a determination step 725 of whether or not both power systems may be near depletion. In a case that both power systems may not be near depletion, the operator may switch the vehicle powering to be under another powering mode, in a step 730. Then in a step 735, the operator may begin operating the vehicle under air power. After driving the vehicle for some distance under air power, energy stored in storage tanks may near depletion in a step 740. Next a determination may be made in a determination step 745 of whether or not both power systems may be near depletion. In many embodiments of the present invention, operating a vehicle using the described power systems, in accordance with embodiments of the present invention, may charge a battery of the vehicle while operating the vehicle in at least an air power mode. Therefore, in the present embodiment, an operator may return vehicle powering back to an electric mode after previously being near depletion by returning to step 730. However, in a case that both powering modes may be near depletion, the vehicle may display a warning indication in a step 750. Next the operator may stop and shut off the vehicle to refuel the vehicle in a step 755 before restarting the vehicle and continuing to drive under a selected power mode.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a vehicle powering system according to the present invention will be apparent to those skilled in the art.

Various aspects of the invention have been described above by way of illustration, and the specific embodiments disclosed are not intended to limit the invention to the particular forms disclosed. The particular implementation of the vehicle powering system may vary depending upon the particular context or application. By way of example, and not limitation, the vehicle powering system described in the foregoing were principally directed to providing a hybrid, compressed air and electric powering system to a car implementation; however, similar techniques may instead be applied to providing a hybrid, compressed gas and electric powering system to motorcycles, boats, airplanes, and trains, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72 (b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system, comprising:
 a power system comprising air and electric motors in communication with each wheel axle, said power system being configured as a power train, wherein each of said motors is configured to transmit power to the associated wheel;
 a heat exchanger to heat expanding air, said heat exchanger being configured to be operable to substantially evenly distribute said heated air to actuate components associated with at least four wheels of a vehicle;
 at least one air tank, said at least one air tank being substantially sufficiently covered by tank heat trace lines so as to maintain a desired level of tank heat;
 a regeneration brake mechanism configured to actuate at least four electric motors to convert mechanical braking energy into electricity for recharging batteries and directly transferred into said heat exchanger as needed; and,
 a two turbine/expansion cascaded system integrated with Interstage reheaters configured to be operable to increase power to air motors and electrical regeneration.

2. The system of claim 1, in which the vehicle further includes a drag reducing arrangement configured to blend mirrors with camera into vehicle body.

3. The system of claim 1, in which the vehicle further includes active aerodynamic with air intake grids configured to divert air toward vehicle wheels and windshield.

4. The system of claim 1, in which the vehicle further includes an aerodynamic power regeneration system in which air from front grid turns impellers to generate power for battery recharging.

5. The system of claim 1, in which the vehicle further includes a cabin cooling and heating system comprising al least a heat pump system configured to provide heating and cooling.

6. The system of claim 1, in which the vehicle further includes a station for rapid filling of tanks with dry air.

7. The system of claim 1, in which the vehicle further includes a plug-in option for a 120-volt trickle charge system configured to be operable for overnight battery charging and a DC charging system for quick charging of battery systems.

8. The system of claim 1, in which the heat exchanger is configured to employ phase change materials as thermal storage for heating expanding air.

9. The system of claim 1, in which individual air motors controlling each wheel eliminates need for conventional engine, transmission and powertrain which thereby creates greater efficiency due to reduced mechanical friction losses.

10. The system of claim 1, in which two cascaded expansion stages are reheated to retrieve more work and avoid icing of exhaust pipe.

11. A system comprising:
 a wheeled vehicle propelled by operation of one of compressed air system and electrical system, the vehicle comprising:
  a plurality of pneumatic motors, one each pneumatic motor connected to each wheel, the pneumatic motors configured to use compressed air to drive each wheel; and
  a plurality of electric motors, two each electric motors connected to each wheel, the electric motors configured to use electric power to drive each wheel,
  in which based at least on a first operator action, the vehicle is propelled by the compressed air system operation, and
  in which based at least on a second operator action, the vehicle is propelled by the electrical system operation.

12. The system of claim 11, in which the compressed air system and the electrical system recharge battery systems.

13. The system of claim 11, in which the compressed air system and the electrical system operate separate from each other and at the discretion of an operator of the vehicle.

14. The system of claim 11, in which exhaust from the compressed air system powers a turbine operable to drive a generator to provide electricity to battery systems.

15. The system of claim 11, in which during operation of the vehicle by the compressed air system, air heated by a heat exchanger is distributed substantially evenly to each of the pneumatic motors and in which a valve at each wheel adjusts air flow to the wheel's corresponding pneumatic motor during turning of the vehicle.

16. The system of claim 11, in which the electrical system is recharged by one of direct current (DC) quick charge connection and low voltage 120-volt trickle charge.

17. The system of claim 11, in which air from a front grill is diverted to impellers configured to turn electric generators to regenerate power and diverted to wheels and windshield to reduce drag.

18. The system of claim 11, in which mirrors and cameras are blended into a side body of the vehicle promoting at least one of a wider field of operator view and reduced drag.

19. The system of claim 11, in which when the vehicle determines that one of the compressed air system and the electrical system is depleted, the vehicle, when being started, uses the non-depleted system.

20. A system comprising:
   means for a power system with compressed air operation and electrical operation configured to operate independently and on a mutually exclusive basis and include:
   means for transferring power directly from a source to wheels;
   means for power and drag reduction;
   means for a multi-stage expansion;
   means for tank heat trace lines;
   means for a regeneration braking system;
   means for active aerodynamic with air intake grids toward wheels and windshield;
   means for aerodynamic power regeneration system;
   means for cabin cooling and heating;
   means for fast charging; and
   means for a plugin option for cold start and in home charging system.

* * * * *